(12) United States Patent
Kim et al.

(10) Patent No.: US 8,233,297 B2
(45) Date of Patent: Jul. 31, 2012

(54) MULTI-STAGE POWER SUPPLY

(75) Inventors: Jong Duck Kim, Gyunggi-do (KR);
Chang Hee Lee, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 202 days.

(21) Appl. No.: 12/838,077

(22) Filed: Jul. 16, 2010

(65) Prior Publication Data

US 2011/0101884 A1 May 5, 2011

(30) Foreign Application Priority Data

Oct. 30, 2009 (KR) .................. 10-2009-0104375

(51) Int. Cl.
*H02M 1/00* (2007.01)
*G05F 1/00* (2006.01)
(52) U.S. Cl. ........... 363/65; 363/71; 315/294; 315/247
(58) Field of Classification Search .............. 363/65, 363/67, 69, 70, 71, 79; 315/291, 294, 312, 315/121, 293, 246, 247; 323/282, 284, 285
See application file for complete search history.

(56) References Cited

U.S. PATENT DOCUMENTS

| | | | | |
|---|---|---|---|---|
| 6,891,736 | B2 * | 5/2005 | Takemura et al. | 363/65 |
| 7,046,533 | B2 * | 5/2006 | Takemura et al. | 363/65 |
| 7,486,032 | B2 * | 2/2009 | Lee | 315/291 |
| 7,923,943 | B2 * | 4/2011 | Peker et al. | 315/312 |
| 7,977,898 | B2 * | 7/2011 | Jang et al. | 318/139 |
| 2009/0091957 | A1 | 4/2009 | Orr et al. | |

* cited by examiner

*Primary Examiner* — Vibol Tan
(74) *Attorney, Agent, or Firm* — Lowe, Hauptman, Ham & Berner, LLP

(57) ABSTRACT

There is provided a multi-stage power supply. A multi-stage power supply according to an aspect of the invention may include: a voltage converter circuit section including a plurality of first to n-th DC/DC converters connected in series between an input terminal and an output terminal, in order to supply a DC driving voltage to an LED array having a plurality of LEDs therein; a voltage detection section detecting an output voltage from the voltage converter circuit section; and a PWM control section generating a PWM control signal on the basis of a first detection voltage from the voltage detection section, a second detection voltage obtained by detecting current flowing through the LED array, and a third detection voltage obtained by detecting a current waveform flowing through an internal switch of the n-th DC/DC converter, and supplying the PWM control signal to each of the first through n-th DC/DC converters.

16 Claims, 4 Drawing Sheets

MULTI-STAGE POWER SUPPLY

CROSS-REFERENCE TO RELATED APPLICATIONS

This application claims the priority of Korean Patent Application No. 10-2009-104375 filed on Oct. 30, 2009, in the Korean Intellectual Property Office, the disclosure of which is incorporated herein by reference.

BACKGROUND OF THE INVENTION

1. Field of the Invention

The present invention relates to multi-stage power supplies that can be applied to displays or lighting systems, and more particularly, to a multi-stage power supply that can integrally control DC/DC converters connected in multiple stages.

2. Description of the Related Art

Recently, the production of LED monitors and LED TVs has been gradually increasing. The levels of LED driving voltages of these LED monitors or LED TVs are determined according to the number of LEDs that are connected in series with each other. In particular, as screen size increases, a higher DC driving voltage is required.

In the case that an insufficient amount of direct current is supplied using one DC/DC converter, research and development has been conducted on power supplies in which a plurality of unit DC/DC converters are connected in multiple stages.

An LED TV requires a DC driving voltage of 40V, 80V or 80V or higher. When an external adaptor is used, a direct current of 14V is generally applied, and DC driving voltage may be boosted up to 40V using a one-stage boost converter.

When a DC driving voltage of 80V or higher is required, it is difficult to supply a DC driving voltage of 40V or higher with a one-stage boost-up converter. When a voltage of 40V or higher is supplied using a one-stage boost-up converter, efficiency is very low, and heat being generated from components is serious. For this reason, two or more boost-up converters are generally used to thereby supply a voltage of 80V or higher.

This existing multi-stage power supply includes a plurality of boost-up converters and a plurality of PWM control sections respectively controlling the plurality of boost-up converters.

However, the existing multi-stage power supply needs to have the plurality of PWM control sections, thereby increasing manufacturing costs and power consumption to operate the plurality of PWM control sections.

SUMMARY OF THE INVENTION

An aspect of the present invention provides a multi-stage power supply that can reduce costs and increase efficiency by integrally controlling DC/DC converters connected in multiple stages.

According to an aspect of the present invention, there is provided a multi-stage power supply, the power supply including: a voltage converter circuit section including a plurality of first to n-th DC/DC converters connected in series between an input terminal and an output terminal, and boosting an input voltage through the input terminal in order to supply a DC driving voltage to an LED array having a plurality of LEDs therein; a voltage detection section detecting an output voltage from the voltage converter circuit section according to a predetermined resistance ratio; and a PWM control section generating a PWM control signal on the basis of a first detection voltage from the voltage detection section, a second detection voltage obtained by detecting current flowing through the LED array, and a third detection voltage obtained by detecting a current waveform flowing through an internal switch of the n-th DC/DC converter, and supplying the PWM control signal to each of the first through n-th DC/DC converters.

According to another aspect of the present invention, there is provided a multi-stage power supply, the power supply including: a voltage converter circuit section connected in series between an input terminal and an output terminal and boosting an input voltage through the input terminal in order to supply a DC driving voltage to an LED array having a plurality of LEDs therein; a voltage detection section detecting an output voltage from the voltage converter circuit section according to a predetermined resistance ratio; a PWM control section generating a PWM control signal and supplying the PWM control signal to each of the plurality of the first to n-th DC/DC converters on the basis of a first detection voltage from the voltage detection section, a second detection voltage obtained by detecting current flowing through the LED array, and a third detection voltage obtained by detecting a current waveform flowing through an internal switch of the n-th DC/DC converter; and a switch circuit section switching off a path through which an operating voltage is supplied to the PWM control section according to a control signal being input in a standby mode.

According to the aspect of the invention, the switch circuit section may supply the operating voltage to the PWM control section by using the input voltage through the input terminal in a normal mode in which normal power supply is required, and cut off the operating voltage being supplied to the PWM control section in a standby mode in which normal power supply is not required.

According to the aspects of the invention, the PWM control section may include: a voltage synthesizer unit synthesizing voltage obtained by dividing the first detection voltage from the voltage detection section at a predetermined resistance ratio and the second detection voltage obtained by detecting the current flowing through the LED array; an error amplifier unit outputting a differential voltage between an output voltage from the voltage synthesizer unit and a predetermined reference voltage; a comparator unit comparing the differential voltage from the error amplifier unit with the third detection voltage to thereby generate a PWM signal; a latch unit synchronizing the PWM signal from the comparator unit with a predetermined clock signal; and a driving circuit unit generating the PWM control signal for gate driving on the basis of the PWM signal synchronized with the predetermined clock signal.

The voltage synthesizer unit may include: first and second resistors dividing the first detection voltage; and a diode having an anode connected to an input terminal of the second detection voltage and a cathode connected to a connection node between the first resistor and the second resistor.

The error amplifier unit may include: a first operational amplifier having a non-inverting input terminal receiving the output voltage from the voltage synthesizer unit through a first impedance element and an inverting input terminal receiving the reference voltage; and a second impedance element connected between an output terminal and the non-inverting input terminal of the first operational amplifier, wherein the error amplifier unit amplifies a differential voltage between the output voltage from the voltage synthesizer unit and the reference voltage by an amplification ratio being determined according to the first and second impedance elements to thereby output the amplified differential voltage.

The comparator unit may include a second operational amplifier having an inverting input terminal receiving the differential voltage from the error amplifier unit and a non-inverting input terminal receiving the third detection voltage, and comparing the differential voltage from the error amplifier unit with the third detection voltage to thereby generate the PWM signal.

The latch unit may include a reset terminal receiving the PWM signal from the comparator unit, a set terminal receiving the clock signal, and an RS latch resetting a signal level whenever the PWM signal becomes high level to thereby generate the PWM signal synchronized with the clock signal.

Each of the plurality of first to n-th DC/DC converters may include a boost-up converter.

The voltage synthesizer unit may include: first and second resistors dividing the first detection voltage; and a transistor having a base connected to an input terminal of the second detection voltage through a third resistor, a collector connected to a connection node between the first resistor and the second resistor through a fourth resistor, and an emitter connected to ground.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
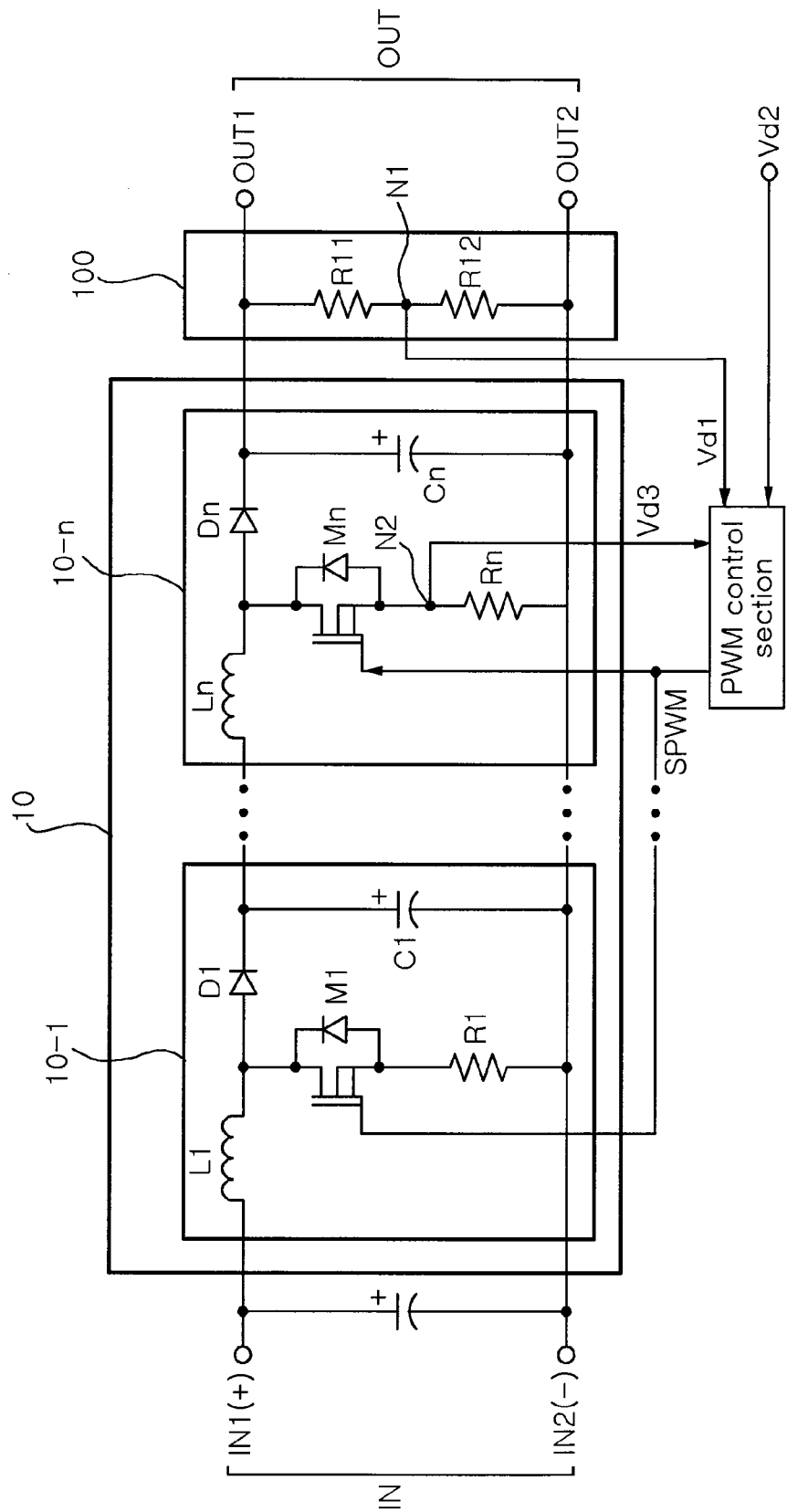
FIG. 1 is a circuit block diagram illustrating a multi-stage power supply according to an exemplary embodiment of the present invention.

Exemplary embodiments of the present invention will now be described in detail with reference to the accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the same reference numerals will be used throughout to designate the components having substantially the same configuration and function.

FIG. 1 is a circuit block diagram illustrating a multi-stage power supply according to an exemplary embodiment of the invention.

Referring to FIG. 1, a multi-stage power supply according to this embodiment includes a voltage converter circuit section 10, a voltage detection section 100, and a PWM control section 200. The voltage converter circuit section 10 includes a plurality of first to n-th DC/DC converters 10-1 to 10-n that are connected in series with each other between an input terminal IN and an output terminal OUT, and boosts an input voltage through the input terminal IN in order to supply a DC driving voltage to an LED array having a plurality of LEDs.

The voltage detection section 100 detects an output voltage from the voltage converter circuit section 10 according to a predetermined resistance ratio. The PWM control section 200 generates a PWM control signal on the basis of a first detection voltage Vd1 from the voltage detection section 100, a second detection voltage Vd2 obtained by detecting current flowing through the LED array, and a third detection voltage Vd3 obtained by detecting a current waveform flowing through an internal switch of the n-th DC/DC converter 10-n, and supplies the PWM control signal to each of the plurality of first to n-th DC/DC converters 10-1 to 10-n.

Here, the current waveform flowing through the internal switch of the n-th DC/DC converter 10-n may be a triangle waveform in Discontinued Current Mode (DCM) when internal inductance is small, while the current waveform may be a pulse waveform having a slope in Continuous Current Mode (CCM) when internal inductance is large.

Therefore, the third detection voltage Vd3 has the same current waveform flowing through the internal switch of the n-th DC/DC converter 10-n.

Figure 2:
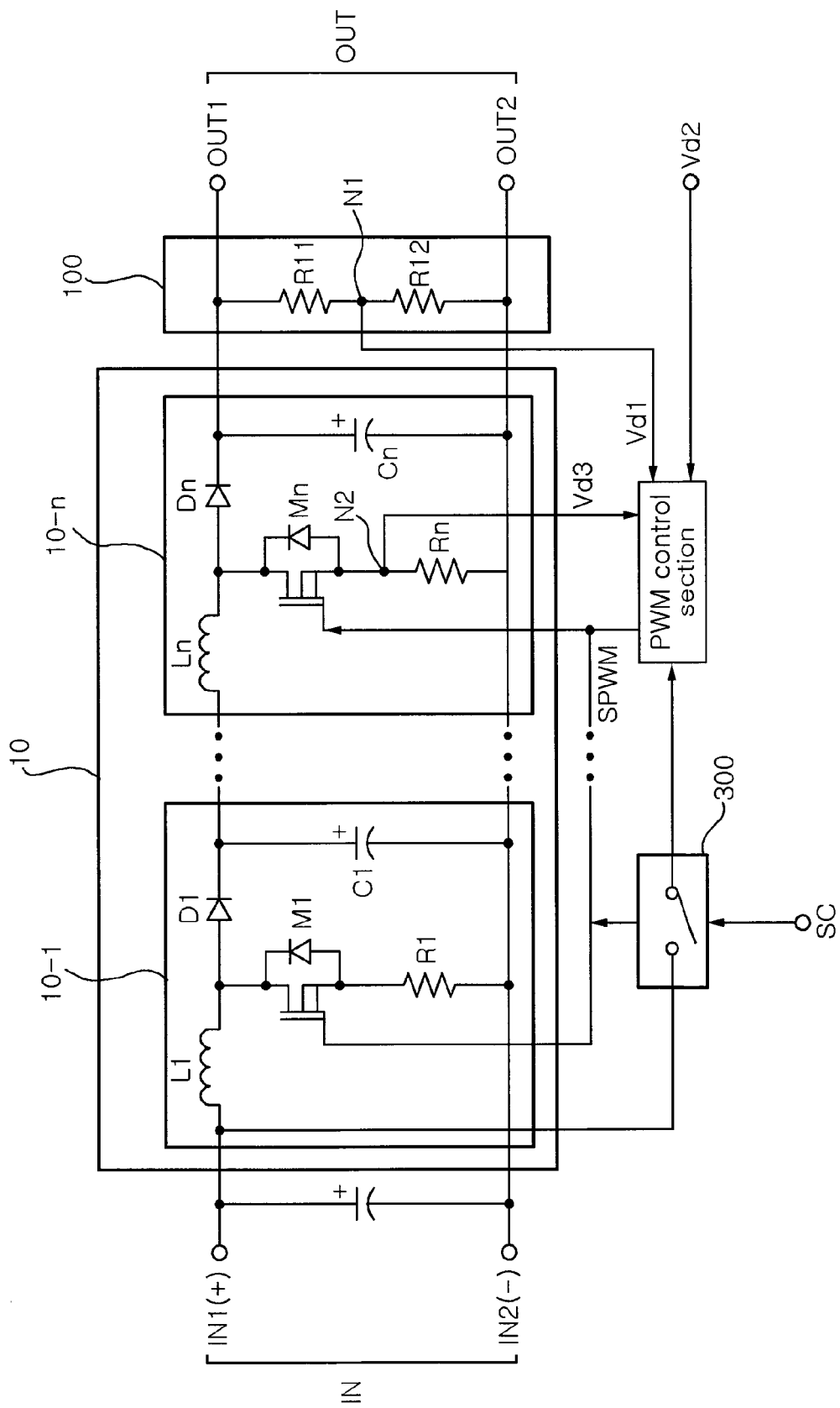
FIG. 2 is a circuit block diagram illustrating a multi-stage power supply according to another exemplary embodiment of the present invention.

FIG. 2 is a circuit block diagram illustrating a multi-stage power supply according to another exemplary embodiment of the invention.

Referring to FIG. 2, the multi-stage power supply according to this embodiment includes a voltage converter circuit section 10, a voltage detection section 100, a PWM control section 200, and a switch circuit section 300. The voltage converter circuit section 10 includes a plurality of first to n-th DC/DC converters 10-1 to 10-n that are connected in series with each other between an input terminal IN and an output terminal OUT, and boosts an input voltage through the input terminal IN in order to supply a DC driving voltage to an LED array having a plurality of LEDs. The voltage detection section 100 detects an output voltage from the voltage converter circuit section 10 according to a predetermined resistance ratio. The PWM control section 200 generates a PWM control signal on the basis of a first detection voltage Vd1 from the voltage detection section 100, a second detection voltage Vd2 obtained by detecting current flowing through the LED array, and a third detection voltage Vd3 obtained by detecting a current waveform flowing through an internal switch of the n-th DC/DC converter 10-n, and supplies the PWM control signal to each of the plurality of first to n-th DC/DC converters 10-1 to 10-n. The switch circuit section 300 switches off a path through which an operating voltage is applied to the PWM control section 200 according to a control signal SC being input in a standby mode.

Here, the switch circuit section 300 supplies the operating voltage to the PWM control section 200 by using the input voltage through the input terminal IN in a normal mode where normal power supply is required, and cuts off the operating voltage being supplied to the PWM control section 200 in a standby mode where normal power supply is not required.

Figure 3:
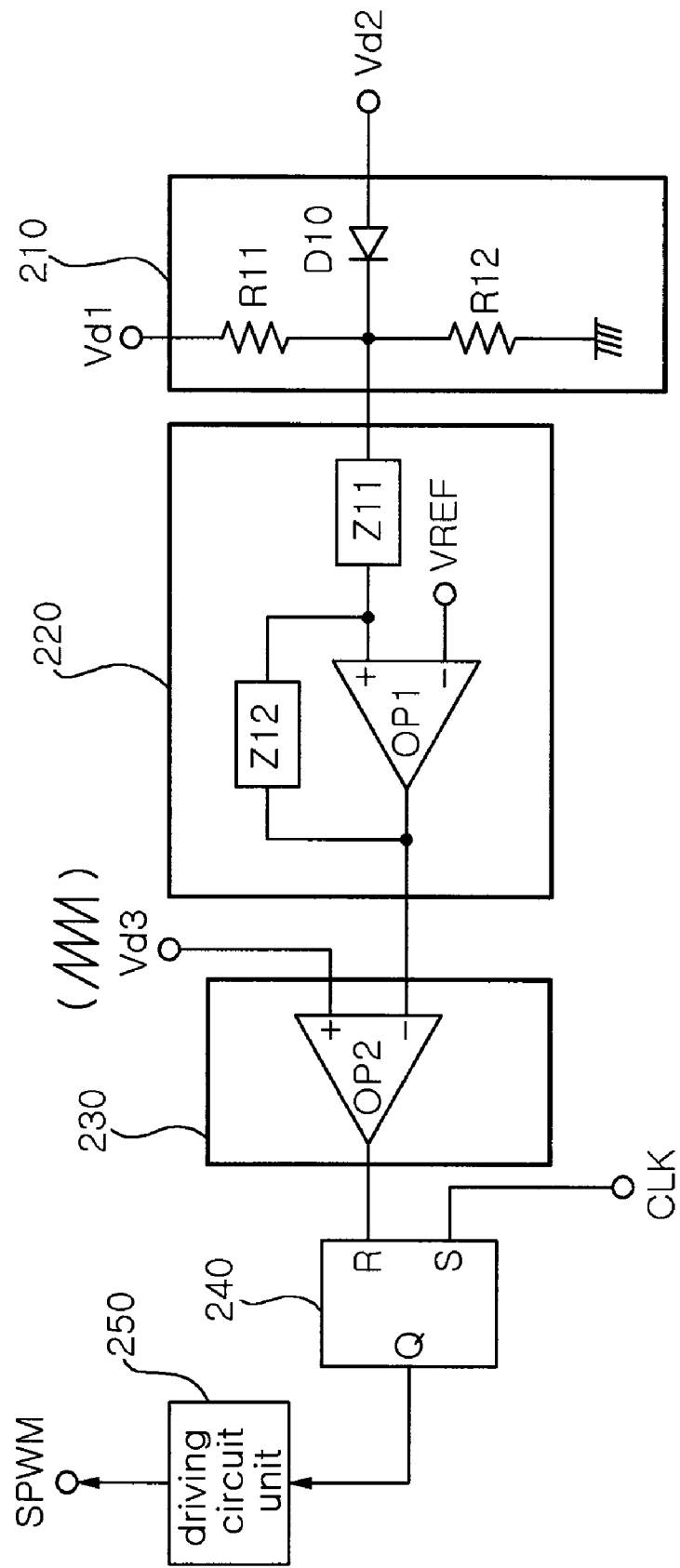
FIG. 3 is a view illustrating the configuration of a PWM control section according to an exemplary embodiment of the present invention.

FIG. 3 is a view illustrating the configuration of a PWM control section according to an exemplary embodiment of the invention. Referring to FIG. 3, the PWM control section 200 may include a voltage synthesizer unit 210, an error amplifier unit 220, a comparator unit 230, a latch unit 240, and a driving circuit unit 250. The voltage synthesizer unit 210 synthesizes voltage obtained by dividing the first detection voltage Vd1 from the voltage detection section 100 by the predetermined resistance ratio and the second detection voltage Vd2 obtained by detecting current flowing through the LED array. The error amplifier unit 220 outputs a differential voltage between an output voltage from the voltage synthesizer unit 210 and a predetermined reference voltage VREF. The comparator unit 230 compares the differential voltage from the error amplifier unit 220 with the third detection voltage Vd3 to thereby generate a PWM signal. The latch unit 240 synchronizes the PWM signal from the comparator unit 230 with a predetermined clock signal. The driving circuit unit 250 generates a PWM control signal for gate driving on the basis of the PWM signal synchronized by the latch unit 240.

Referring to FIG. 3, the voltage synthesizer unit 210 may include a first resistor R11 and a second resistor R12 that divide the first detection voltage Vd1, and a diode D10 that has an anode connected to an input terminal of the second detection voltage Vd2, and a cathode connected to a connection node between the first resistor R11 and the second resistor R12.

The error amplifier unit 220 includes a first operational amplifier OP1 and a second impedance element Z12. The first operational amplifier OP1 has a non-inverting input terminal receiving the output voltage from the voltage synthesizer unit 210 through a first impedance element Z11 and an inverting input terminal IN receiving reference voltage VREF. The second impedance element Z12 is connected between an output terminal and the non-inverting input terminal of the first operational amplifier OP1. The error amplifier unit 220 having this configuration amplifies a differential voltage between the output voltage from the voltage synthesizer unit 210 and the reference voltage VREF by an amplification rate determined according to the first and second impedance elements Z11 and Z12 to thereby output the amplified differential voltage.

The comparator unit 230 may include a second operational amplifier OP2 that has an inverting input terminal receiving the differential voltage from the error amplifier unit 220 and a non-inverting input terminal receiving the third detection voltage Vd3, and compares the differential voltage from the error amplifier unit 220 and the third detection voltage Vd3 to thereby generate the PWM signal.

The latch unit 240 may include a reset terminal R receiving the PWM signal from the comparator unit 230, a set terminal S receiving the clock signal CLK, and an RS latch resetting a level at an output terminal Q whenever the PWM signal becomes high level to thereby generate the synchronized PWM signal.

Figure 4:
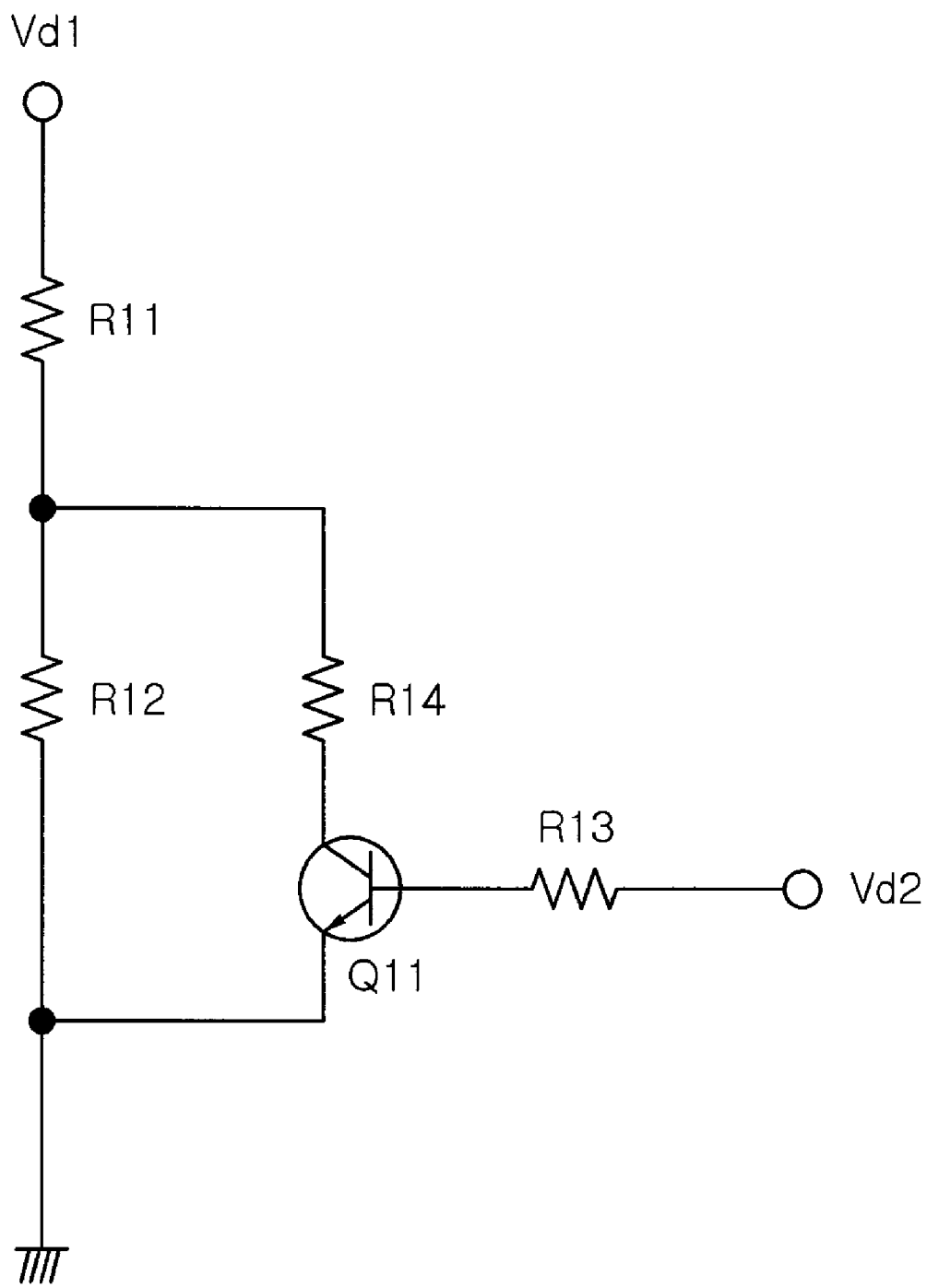
FIG. 4 is a circuit diagram illustrating a voltage synthesizer unit according to an exemplary embodiment of the present invention.

FIG. 4 is a circuit diagram illustrating a voltage synthesizer unit according to an exemplary embodiment of the invention.

Referring to FIG. 4, the voltage synthesizer unit 210 may include a first resistor R11 and a second resistor R12, and a transistor Q11. The first and second resistors R11 and R12 divide the first detection voltage Vd1. The transistor Q11 has a base connected to the input terminal of the second detection voltage Vd2 through a third resistor R13, a collector connected to a connection node between the first resistor R11 and the second resistor R12 through a fourth resistor R14, and an emitter connected to ground.

In this embodiment, each of the plurality of first to n-th DC/DC converters 10-1 to 10-*n* may be composed of a boost-up converter.

Here, the first DC/DC converter 10-1 may include a coil L1 having one end connected to the input terminal IN, a diode D1 having a cathode connected to an output terminal of the first DC/DC converter 10-1 connected to the other end of the coil L1, a capacitor C1 connected between the cathode of the diode D1 and ground, and a MOS transistor M1 connected between an anode of the diode D1 and ground and performing a switching operation according to the PWM signal SPWM synchronized with the clock signal.

The n-th DC/DC converter 10-*n* may include a coil Ln having one end connected to an input terminal of the n-th DC/DC converter 10-*n*, a diode Dn having a cathode connected to an output terminal of the n-th DC/DC converter 10-*n* connected to the other end of the coil Ln, a capacitor Cn connected between the cathode of the diode Dn and ground, and a MOS transistor Mn connected between an anode of the diode Dn and ground and performing a switching operation according to the PWM signal SPWM synchronized with the clock signal.

Hereinafter, the operation and effects of the invention will be described in detail with reference to the accompanying drawings.

The multi-stage power supply according to the above-described exemplary embodiments of the invention will be described with reference to FIGS. 1 and 2. The voltage converter circuit section 10 of each of the multi-stage power supplies, shown in FIGS. 1 and 2, includes the plurality of first to n-th DC/DC converters 10-1 to 10-*n* that are connected in series between the input terminal IN and the output terminal OUT in order to boost an input voltage to a desired high voltage and supply the high voltage to the LED array.

Each of the plurality of first to n-th DC/DC converters 10-1 to 10-*n* may have the configuration as shown in FIG. 1. That is, the first DC/DC converter 10-1 may include the coil L1, the diode D1, the capacitor C1, and the MOS transistor M1, while the n-th DC/DC converter 10-*n* may include the coil Ln, the diode Dn, the capacitor Cn, and the MOS transistor Mn.

The boost-up converter boosts the input voltage according to the switching operation of the MOS transistor that is turned on or off according to the PWM signal. As the MOS transistor is turned on for a longer period of time, the level of the high voltage is gradually increased.

According to the above-described operation, each of the plurality of first to n-th DC/DC converters 10-1 to 10-*n* boosts the input voltage according to the PWM signal PWM and outputs the boosted input voltage. The process of generating the PWM signal will be described below.

In FIGS. 1 and 2, the voltage detection section 100 according to this embodiment detects the output voltage from the voltage converter circuit section 10 according to the predetermined resistance ratio, and outputs the first detection voltage Vd1 to the PWM control section 200.

The PWM control section 200 generates the PWM control signal on the basis of the first detection voltage Vd1 from the voltage detection section 100, the second detection voltage Vd2 obtained by detecting current flowing through the LED array, and the third detection voltage Vd3 obtained by detecting current waveform flowing through the internal switch of the n-th DC/DC converter 10-*n*, and supplies the generated PWM control signal to each of the plurality of first to n-th DC/DC converters 10-1 to 10-*n*.

Referring to FIG. 2, the multi-stage power supply according to another exemplary embodiment of the invention may further include the switch circuit section 300. The switch circuit section 300 may switch off a path through which the operating voltage is applied to the PWM control section 200 according to the control signal SC being input in a standby mode.

More specifically, the switch circuit section 300 may supply the operating voltage to the PWM control section 200 by using the input voltage through the input terminal IN in a normal mode in which normal power supply is required, and cut off the operating voltage being supplied to the PWM control section 200 in a standby mode in which normal power supply is not required.

Therefore, the power being supplied to the PWM control section is cut off in the standby mode, thereby reducing power consumption.

Hereinafter, the PWM control section 200 according to this embodiment will be described with reference to FIG. 3.

Referring to FIG. 3, in the PWM control section 200, the voltage synthesizer unit 210 of the PWM control section 200 synthesizes voltage obtained by dividing the first detection voltage Vd1 from the voltage detection section 100 according to the predetermined resistance ratio and the second detection voltage Vd2 obtained by detecting current flowing through the LED array, and then outputs the synthesized voltage to the error amplifier unit 220.

For example, when the voltage synthesizer unit 210 is realized as an actual circuit as shown in FIG. 3, in the voltage synthesizer unit 210, the first detection voltage Vd1 is divided by the first resistor R11 and the second resistor R12, and voltage satisfying the following Equation 1 are obtained in the second resistor R12. The diode D10 conducts at the second detection voltage Vd2, so that a current Id2 flows through the second resistor R12. An additional voltage satisfying the following Equation 2 is applied to the second resistor R12 by the second detection voltage Vd2. As a result, a synthesized voltage Vsum to be applied to the second resistor R12 satisfies Equation 3.

Divided voltages=$[(R12)/(R11+R12)] \times Vd1$ [Equation 1]

Additional voltage=$R12 \times Id2$ [Equation 2]

Synthesized voltage($V$sum)=divided voltage+additional voltages=$[(R12)/(R11+R12)] \times Vd1 + R12 \times Id2$ [Equation 3]

In another example, when the voltage synthesizer unit 210 is realized as an actual circuit as shown in FIG. 4, in the voltage synthesizer unit 210, the first detection voltage Vd1 is divided by the first resistor R11 and the second resistor R12, and a divided voltage satisfying the following Equation 1 are obtained in the second resistor R12. The transistor Q11 is turned on due to the second detection voltage Vd2, so that the second resistor R12 and the fourth resistor R14 are connected in parallel with each other, thereby lowering equivalent resistance. As a result, a synthesized voltage Vsum to be applied to an equivalent resistor of the second resistor R12 and the fourth resistor R14 is lowered.

As described above, as for the voltage synthesizer unit 210, shown in FIG. 3, the synthesized voltage is increased according to the second detection voltage Vd2. On the other hand, as for the voltage synthesizer unit 210, shown in FIG. 4, the synthesized voltage is lowered according to the second detection voltage Vd2. A selection is made between the two different voltage synthesizer units according to how the synthesized voltage is applied to voltage feedback control and how a reference voltage is determined.

The voltage synthesizer unit 210 may include may include the first resistor R11, the second resistor R12, and the transistor Q11. The first and second resistors R11 and R12 divide the first detection voltage Vd1. The transistor Q11 has a base connected to the input terminal of the second detection voltage Vd2 through the third resistor R13, a collector connected to a connection node between the first resistor R11 and the second resistor R12 through the fourth resistor R14, and an emitter connected to ground.

Then, the error amplifier unit 220 outputs the differential voltage between the output voltage from the voltage synthesizer unit 210 and the predetermined reference voltage VREF to the comparator unit 230.

For example, when the error amplifier unit 220 is realized as an actual circuit as shown in FIG. 3, the first operational amplifier OP1 of the error amplifier unit 220 amplifies the differential voltage between the output voltage from the voltage synthesizer unit 210, which is input through the non-inverting input terminal via the first impedance element Z11, and the reference voltage VREF, which is input through the inverting input terminal IN, by the amplification ratio that is determined according to the first and second impedance elements Z11 and Z12.

Here, the amplification ratio may be controlled by setting the impedances of the first and second impedance elements Z11 and Z12.

Then, the comparator unit 230 compares the differential voltage from the error amplifier unit 220 with the third detection voltage Vd3 to thereby generate the PWM signal, and outputs the generated PWM signal to the latch unit 240.

For example, when the comparator unit 230 is realized as an actual circuit, as shown in FIG. 3, the second operational amplifier OP2 of the comparator unit 230 compares the differential voltage from the error amplifier unit 220, which is input through the inverting input terminal, with the third detection voltage Vd3, which is input through the non-inverting input terminal, and generates a PWM signal having a high level when the third detection voltage Vd3 has a higher level than the differential voltage from the error amplifier unit 220.

Then, the latch unit 240 synchronizes the PWM signal from the comparator unit 230 with a predetermined clock signal, and outputs the synchronized PWM signal to the driving circuit unit 250.

For example, when the latch unit 240 is realized as an actual circuit as shown in FIG. 3, the RS latch of the latch unit 240 resets a level at an output terminal Q whenever the PWM signal, being input through the reset terminal R, becomes high level, so that the latch unit 240 outputs the PWM signal, synchronized with the clock signal being input through the set terminal S, through the output terminal Q.

The driving circuit unit 250 generates a PWM control signal for gate driving on the basis of the PWM signal synchronized with the clock signal from the latch unit 240, and supplies the PWM control signal to each of the plurality of first to n-th DC/DC converters 10-1 to 10-n.

The above-described power supply can supply a voltage of approximately 40V using a single boost-up converter. For example, when boost-up converters are arranged in two stages, a voltage of 12 to 14V is boosted to thereby supply a voltage of approximately 80V. The power supply according to the exemplary embodiment of the invention can control the plurality of DC/DC converters using one PWM control section, thereby reducing manufacturing costs and enhancing energy efficiency.

As set forth above, according to exemplary embodiments of the invention, a plurality of DC/DC converters, connected in multiple stages, can be integrally controlled to thereby reduce manufacturing costs and efficiency.

That is, as the plurality DC/DC converts can be controlled using one PWM control section, when an output voltage is higher than an input voltage, manufacturing costs can be reduced, efficiency can be improved, and circuit implementation can be simplified to thereby increase productivity. Furthermore, since heat, generated from inductors, MOS FETs, and diodes, is reduced to half or less, slimmer applications can be manufactured, and components can be manufactured at low cost, and failure rates can be reduced since the stress of the components is reduced to half or less.

While the present invention has been shown and described in connection with the exemplary embodiments, it will be apparent to those skilled in the art that modifications and variations can be made without departing from the spirit and scope of the invention as defined by the appended claims.

What is claimed is:

1. A multi-stage power supply, the power supply comprising:
- a voltage converter circuit section including a plurality of first to n-th DC/DC converters connected in series between an input terminal and an output terminal, and boosting an input voltage through the input terminal in order to supply a DC driving voltage to an LED array having a plurality of LEDs therein;
- a voltage detection section detecting an output voltage from the voltage converter circuit section according to a predetermined resistance ratio; and
- a PWM control section generating a PWM control signal on the basis of a first detection voltage from the voltage detection section, a second detection voltage obtained by detecting current flowing through the LED array, and a third detection voltage obtained by detecting a current waveform flowing through an internal switch of the n-th DC/DC converter, and supplying the PWM control signal to each of the first through n-th DC/DC converters.

2. The power supply of claim 1, wherein the PWM control section comprises:
- a voltage synthesizer unit synthesizing voltage obtained by dividing the first detection voltage from the voltage detection section at a predetermined resistance ratio and the second detection voltage obtained by detecting the current flowing through the LED array;
- an error amplifier unit outputting a differential voltage between an output voltage from the voltage synthesizer unit and a predetermined reference voltage;
- a comparator unit comparing the differential voltage from the error amplifier unit with the third detection voltage to thereby generate a PWM signal;
- a latch unit synchronizing the PWM signal from the comparator unit with a predetermined clock signal; and
- a driving circuit unit generating the PWM control signal for gate driving on the basis of the PWM signal synchronized with the predetermined clock signal.

3. The power supply of claim 2, wherein the voltage synthesizer unit comprises:
- first and second resistors dividing the first detection voltage; and
- a diode having an anode connected to an input terminal of the second detection voltage and a cathode connected to a connection node between the first resistor and the second resistor.

4. The power supply of claim 2, wherein the error amplifier unit comprises:
- a first operational amplifier having a non-inverting input terminal receiving the output voltage from the voltage synthesizer unit through a first impedance element and an inverting input terminal receiving the reference voltage; and
- a second impedance element connected between an output terminal and the non-inverting input terminal of the first operational amplifier,
- wherein the error amplifier unit amplifies a differential voltage between the output voltage from the voltage synthesizer unit and the reference voltage by an amplification ratio being determined according to the first and second impedance elements to thereby output the amplified differential voltage.

5. The power supply of claim 2, wherein the comparator unit comprises a second operational amplifier having an inverting input terminal receiving the differential voltage from the error amplifier unit and a non-inverting input terminal receiving the third detection voltage, and comparing the differential voltage from the error amplifier unit with the third detection voltage to thereby generate the PWM signal.

6. The power supply of claim 2, wherein the latch unit comprises a reset terminal receiving the PWM signal from the comparator unit, a set terminal receiving the clock signal, and an RS latch resetting a signal level whenever the PWM signal becomes high level to thereby generate the PWM signal synchronized with the clock signal.

7. The power supply of claim 1, wherein each of the plurality of first to n-th DC/DC converters comprises a boost-up converter.

8. A multi-stage power supply, the power supply comprising:
- a voltage converter circuit section connected in series between an input terminal and an output terminal and boosting an input voltage through the input terminal in order to supply a DC driving voltage to an LED array having a plurality of LEDs therein;
- a voltage detection section detecting an output voltage from the voltage converter circuit section according to a predetermined resistance ratio;
- a PWM control section generating a PWM control signal and supplying the PWM control signal to each of the plurality of the first to n-th DC/DC converters on the basis of a first detection voltage from the voltage detection section, a second detection voltage obtained by detecting current flowing through the LED array, and a third detection voltage obtained by detecting a current waveform flowing through an internal switch of the n-th DC/DC converter; and
- a switch circuit section switching off a path through which an operating voltage is supplied to the PWM control section according to a control signal being input in a standby mode.

9. The power supply of claim 8, wherein the switch circuit section supplies the operating voltage to the PWM control section by using the input voltage through the input terminal in a normal mode in which normal power supply is required, and cuts off the operating voltage being supplied to the PWM control section in a standby mode in which normal power supply is not required.

10. The power supply of claim 8, wherein the PWM control section comprises:
- a voltage synthesizer unit synthesizing voltage obtained by dividing the first detection voltage from the voltage detection section according to a predetermined resistance ratio and the second detection voltage obtained by detecting the current flowing through the LED array;
- an error amplifier unit outputting a differential voltage between an output voltage from the voltage synthesizer unit and a predetermined reference voltage;
- a comparator unit comparing the differential voltage from the error amplifier unit with the third detection voltage to thereby generate a PWM signal;
- a latch unit synchronizing the PWM signal with a predetermined clock signal; and
- a driving circuit unit generating the PWM control signal for gate driving on the basis of the PWM signal synchronized with the predetermined clock signal from the latch unit.

11. The power supply of claim 10, wherein the voltage synthesizer unit comprises:
- first and second resistors dividing the first detection voltage; and a diode having an anode connected to an input terminal of the second detection voltage and a cathode connected to a connection node between the first resistor and the second resistor.

12. The power supply of claim 10, wherein the error amplifier unit comprises:
    a first operational amplifier having a non-inverting input terminal receiving the output voltage from the voltage synthesizer unit through a first impedance element and an inverting input terminal receiving the reference voltage; and
    a second impedance element connected between the non-inverting input terminal and an output terminal of the first operational amplifier,
    wherein the error amplifier unit amplifies a differential voltage between the output voltage from the voltage synthesizer unit and the reference voltage.

13. The power supply of claim 10, wherein the comparator unit comprises a second operational amplifier having an inverting input terminal receiving a differential voltage from the error amplifier unit and a non-inverting input terminal receiving the third detection voltage, and comparing the differential voltage from the error amplifier unit with the third detection voltage to thereby generate the PWM signal.

14. The power supply of claim 10, wherein the latch unit comprises a reset terminal receiving the PWM signal from the comparator unit, a set terminal receiving the clock signal, and an RS latch resetting a signal level whenever the PWM signal becomes high level to thereby generate the PWM signal synchronized with the clock signal.

15. The power supply of claim 8, wherein each of the plurality of first to n-th DC/DC converters comprises a boost-up converter.

16. The power supply of claim 10, wherein the voltage synthesizer unit comprises:
    first and second resistors dividing the first detection voltage; and
    a transistor having a base connected to an input terminal of the second detection voltage through a third resistor, a collector connected to a connection node between the first resistor and the second resistor through a fourth resistor, and an emitter connected to ground.

* * * * *